United States Patent [19]
Hwang

[11] Patent Number: 5,369,631
[45] Date of Patent: Nov. 29, 1994

[54] RECORDING/REPRODUCING APPARATUS FOR OPTICAL TAPE

[75] Inventor: Won-Jae Hwang, Suwon, Rep. of Korea

[73] Assignee: Samsung Electronics Co., Ltd., Kyungki, Rep. of Korea

[21] Appl. No.: 963,672

[22] Filed: Oct. 20, 1992

[30] Foreign Application Priority Data

Oct. 21, 1991 [KR] Rep. of Korea ............... 91-18521
Oct. 23, 1991 [KR] Rep. of Korea ............... 91-18684

[51] Int. Cl.$^5$ ............................................. G11B 7/00
[52] U.S. Cl. ................................ 369/113; 369/180
[58] Field of Search ............. 369/113, 114, 117, 118, 369/100, 119, 121, 44.14, 44.17, 44.18; 360/114

[56] References Cited

U.S. PATENT DOCUMENTS 4,178,615 12/1979 Shimooka et al. ............... 369/118
4,970,707 11/1990 Hara et al. ............... 369/44.11

Primary Examiner—Constantine Hannaher
Assistant Examiner—Don Wong
Attorney, Agent, or Firm—Sughrue, Mion, Zinn, Macpeak & Seas

[57] ABSTRACT

A recording/reproducing apparatus for an optical tape for optically recording and reproducing information on an optical tape having a thermal converting layer. An optical pickup is divided into two separate parts, one for recording and the other for reproducing, and has an erasing device for optically erasing with the optical pickup for reproducing. The optical pickup for reproducing has a collimating lens for collimating the divergent light beam of a laser diode for reproducing or erasing the information group recorded on at least one track of the optical tape at the same time, a cylindrical lens for focussing the collimated light beam in the vertical direction, and a photodiode array for detecting light reflected from the tape. Also, the optical pickup for reproducing employs an aperture having a square hole for effectively focussing the light beam.

9 Claims, 7 Drawing Sheets

RECORDING/REPRODUCING APPARATUS FOR OPTICAL TAPE

BACKGROUND OF THE INVENTION

1. Field of the Invention

The present invention relates to a recording/reproducing apparatus for optically recording and reproducing information on an optical tape having a thermal converting layer, and more particularly, to a recording/reproducing apparatus for an optical tape which optically performs recording, reproducing and erasing of information.

2. Description of the Related Art

U.S. Pat. No. 4,398,203 discloses an optical tape having a thermal converting layer. Bumps are formed on the thermal converting layer when it is heated. The bumps remain even after cooling. Also, when the thermal converting layer is re-heated by a predetermined thermal energy, the bumps disappear and the thermal converting layer is restored to its original smooth state. Therefore, it is possible to optically record/reproduce information using an optical recording medium having such a thermal converting layer. That is, the information is optically recorded by scanning a focussed light on the optical recording medium and modulating the light according to the desired information. Then, the information is optically reproduced by directing scanning light, having an energy which is too low to affect the thermal converting layer, toward the optical recording medium and detecting the light reflected therefrom.

Such an optical recording medium having a thermal converting layer can be produced in the form of a tape, similar to a magnetic recording tape, so that it can store more information than a conventional disk-type optical recording medium.

Figure 1:
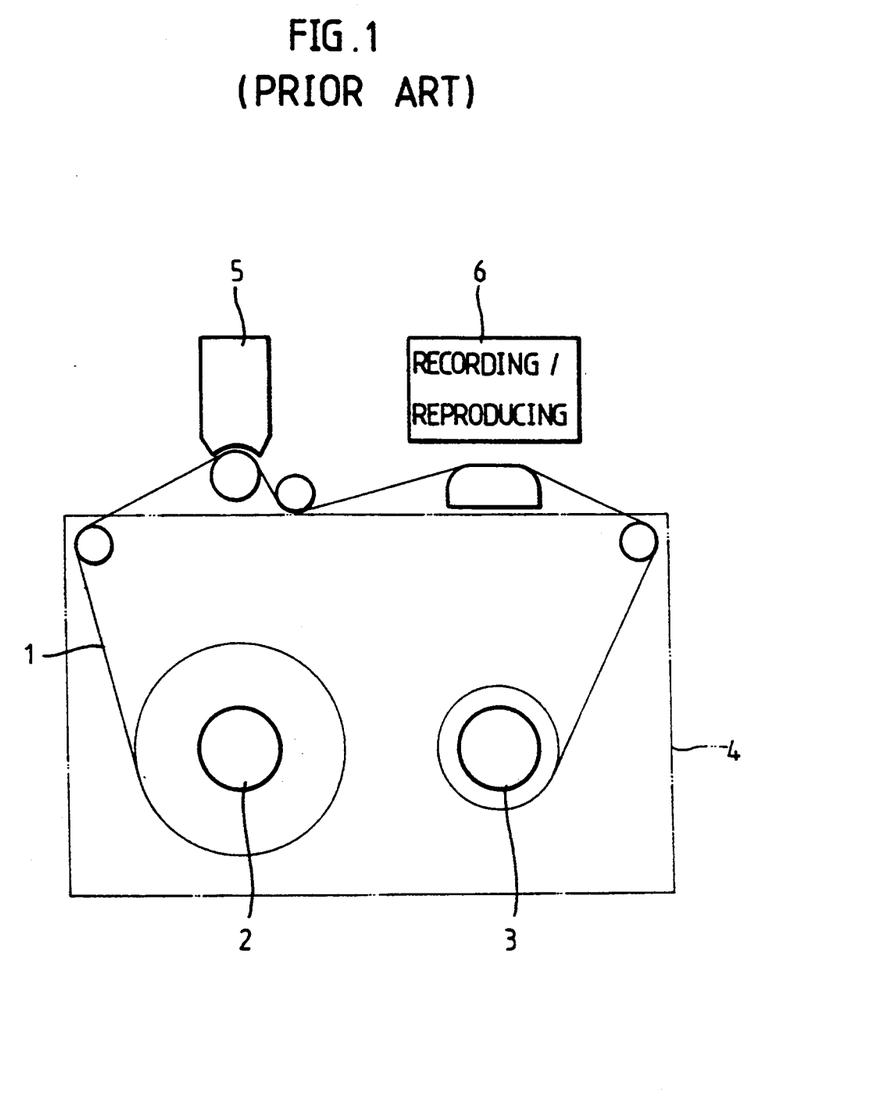
FIG. 1 is a schematic representation of a recording/reproducing apparatus for a conventional optical tape.

FIG. 1 shows a conventional optical recording/reproducing apparatus using such an optical recording medium formed as a tape having a thermal converting layer. The apparatus uses an optical tape 1 wound on a pair of reels 2 and 3 and received in a cassette 4. Optical tape 1 starts from one reel 2, sequentially passes near a heating head 5 for erasing and an optical pickup 6, for recording/reproducing, and is wound to the other reel 3. During recording, heating head 5 is heated to raise the temperature of, and slightly press, optical tape 1, and, at the same time, a light for recording having a predetermined energy is radiated from optical pickup 6 for recording data. When heating head 5 is withdrawn, a light for reproducing, having another predetermined energy which is lower than that of the recording light, is radiated from optical pickup 6 so as to record data. A cooler (not shown) may be added for cooling the tape down to a proper temperature for recording after optical tape 1 is heated by heating head 5 and before it reaches optical pickup 6.

Figure 2:
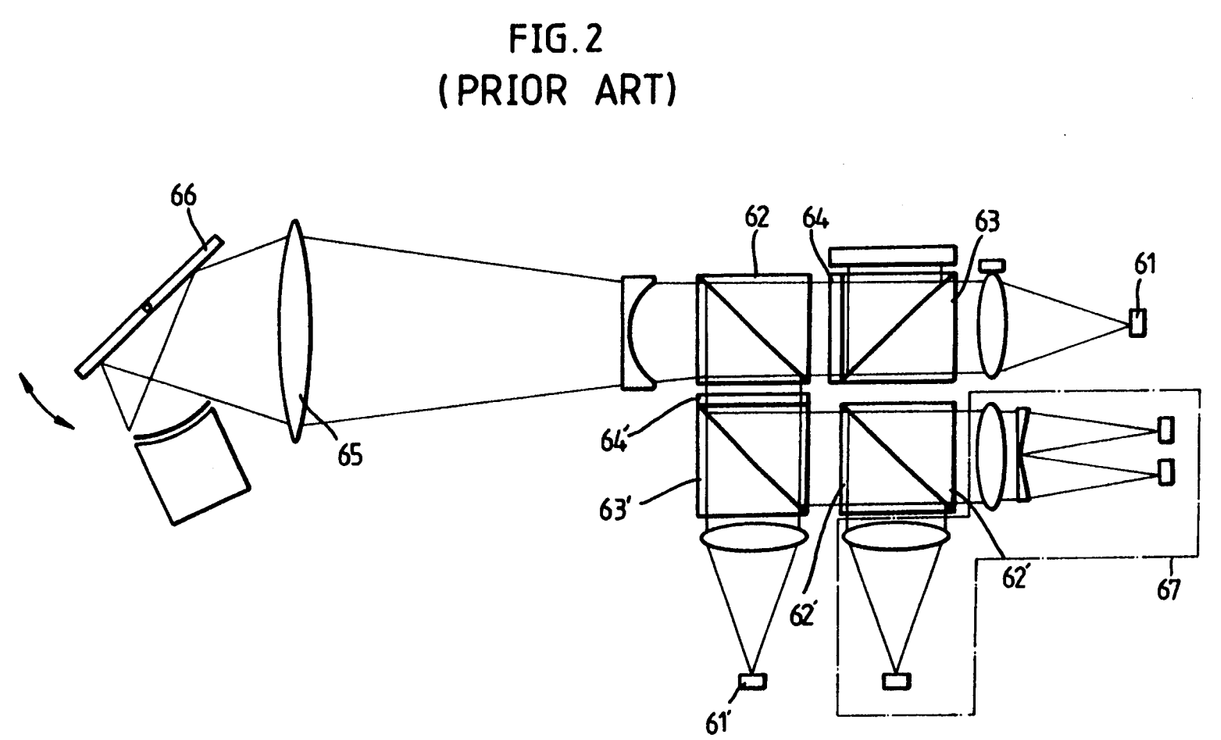
FIG. 2 is a schematic representation of the optical construction of a conventional optical pickup for recording/reproducing.

Optical pickup 6, in the conventional apparatus, is shown in FIG. 2. Two laser diodes 61 and 61' are provided to radiate light beams having different amounts of energy for recording and reproducing, respectively. Beam splitters 62 and 62', deflection beam splitters 63 and 63', and phase plates 64 and 64' are also provided. Also, a galvanometer mirror 66 is installed in front of an objective lens 65. A detecting optical system 67 is constituted by a plurality of detecting lens and photodiodes for tracking/focusing servo operation during reproducing.

In such a conventional device, time is required for heating head 5 to be heated to a predetermined temperature during recording. Also, since a separate cooler is required its design is difficult and the cost is increased. Also, galvanometer mirror 66 must be operated during a reproducing operation resulting in excessive power consumption and mechanical noise generation.

SUMMARY OF THE INVENTION

The first object of the present invention is to provide an improved optical pickup for recording/reproducing, thereby providing a recording/reproducing apparatus for an optical tape having an optical pickup which is simple in construction, has reduced power consumption, and eliminates mechanical noise generation.

The second object of the present invention is to provide an optical tape which optically performs recording, reproducing and erasing without delay.

To achieve the first object of the present invention, there is provided a recording/reproducing apparatus for an optical tape having an optical pickup device which scans an optical tape having a thermal converting layer with a light beam having a first predetermined amount of heat energy. The light beam is modulated according to information so as to record the information onto the optical tape. A light having a second predetermined amount of heat energy is caused to fall incident upon the tape and the light reflected therefrom is detected so as to reproduce the information. The optical pickup device is divided into two parts, one for recording and the other for reproducing, which are selectively operated depending upon whether recording or reproducing is required.

To achieve the second object of the present invention, there is provided a recording/reproducing apparatus for an optical tape which has two optical pickups, one for recording and the other for reproducing and an erasing device for optically erasing the information. The optical pickup for reproducing is installed in front of the optical pickup for recording with respect to the direction of travel of the recording medium.

BRIEF DESCRIPTION OF THE DRAWINGS

Further features and advantages of the present invention will become more apparent from the following description of the preferred embodiments of the invention as illustrated in the accompanying drawings wherein.

DETAILED DESCRIPTION OF THE PREFERRED EMBODIMENTS

Figure 3:
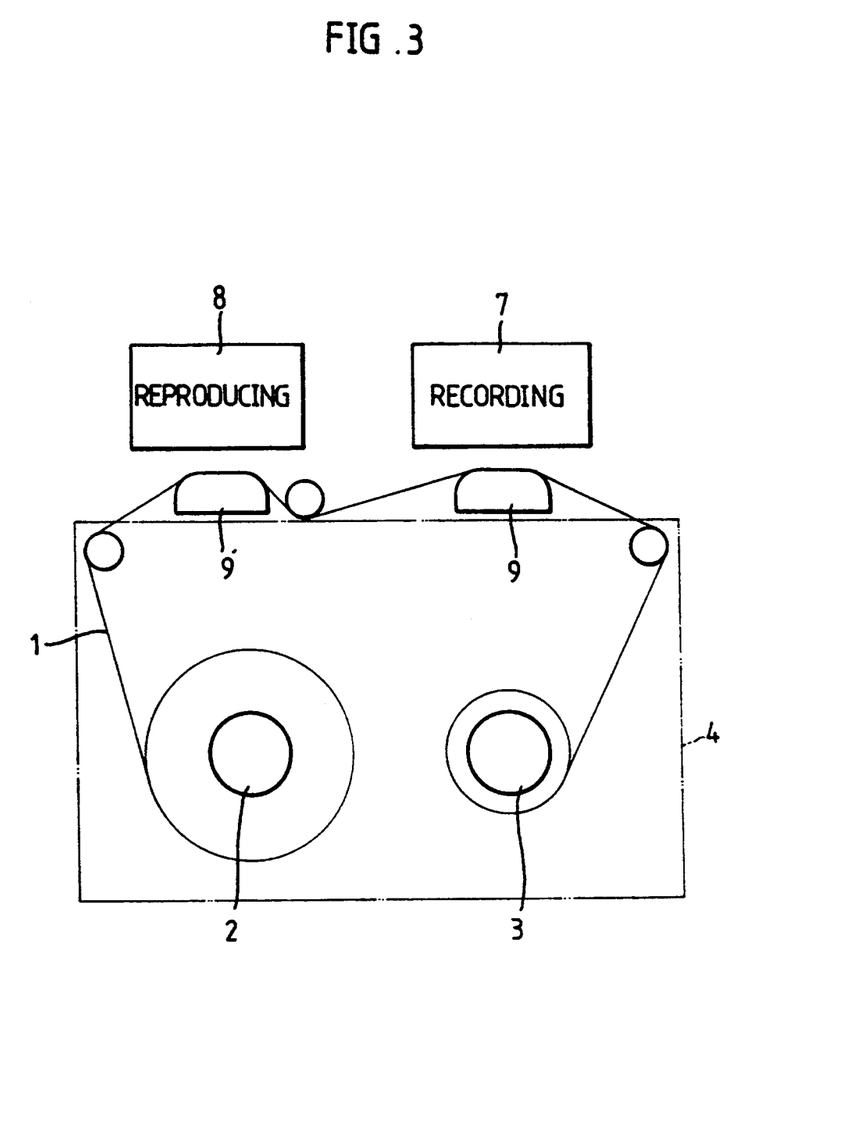
FIG. 3 is a schematic representation of a recording/reproducing apparatus for an optical tape according to the first preferred embodiment of the present invention.

FIG. 3 is a recording/reproducing apparatus for an optical tape according to the first embodiment of the present invention. As shown in FIG. 3, an optical tape 1 is wound around a pair of reels 2 and 3, and received in a cassette 4. Optical tape 1 is guided to unwind from one reel 2 and wind around the other reel 3 via tape supporting rods 9 and 9'. A recording optical pickup 7 and a reproducing optical pickup 8 are disposed in opposition to tape supporting rods 9 and 9', respectively. In such an apparatus, only recording optical pickup 7 operates during recording, while only reproducing optical pickup 8 operates during reproducing. In order to erase the information already recorded on optical tape 1 during recording, either the aforementioned ordinary heating head (not shown) is added, or an erasing device (which is described below) is employed.

Figure 4:
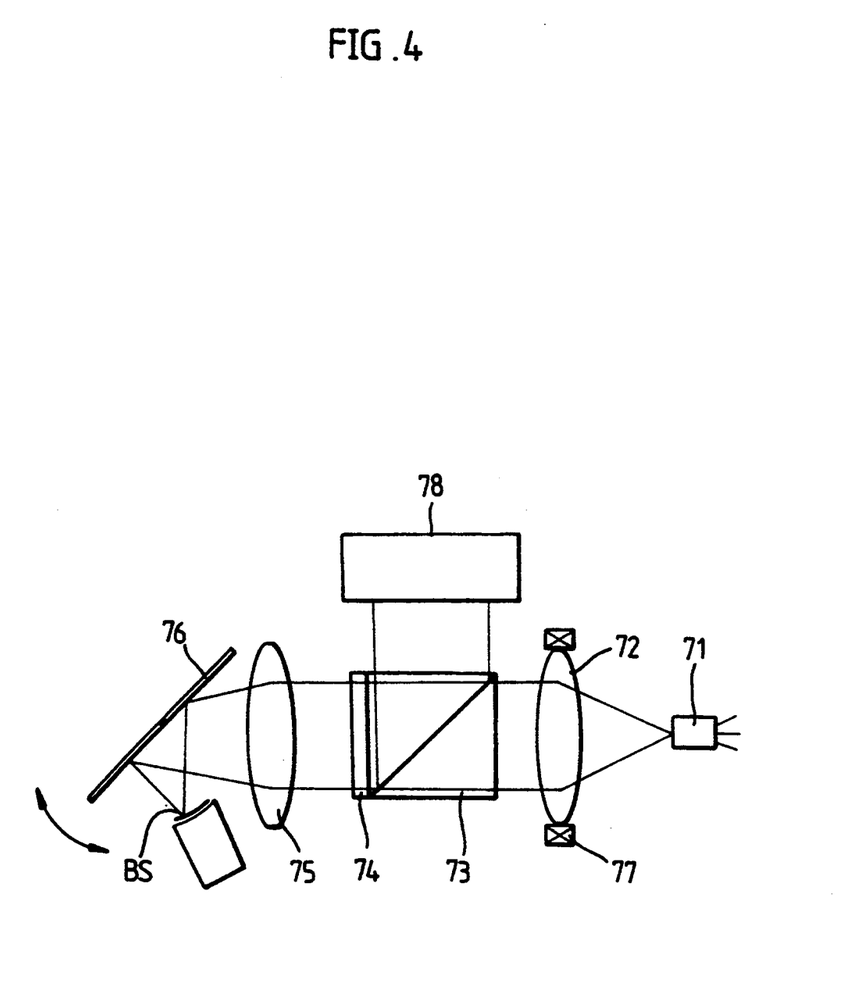
FIG. 4 is a schematic representation of the optical construction of an optical pickup for recording in the first preferred embodiment of the present invention.

In the first embodiment, recording optical pickup 7, as shown in FIG. 4, has a laser diode 71 emitting a light beam which is modulated in accordance with the recorded information, a collimating lens 72 for collimating the light emitted from laser diode 71, a beam splitter 73 separating an incident light beam and the reflected light beam, a quarter phase plate 74 for changing a linearly polarized wave to a circularly polarized wave, an objective lens 75 for focussing the light beam passing through quarter phase plate 74 onto optical tape 1 to provide a beam spot BS on optical tape 1, and a galvanometer mirror 76 for reflecting the incident light beam focussed on optical tape 1 and periodically rotating so as to scan beam spot BS in the width direction on optical tape 1. Collimating lens 72 is moved in the direction perpendicular to the optical axis by actuator coil 77, so that the diameter of beam spot BS on optical tape 1 is not enlarged over the rotating angle of galvanometer mirror 76. Meanwhile, the light beam reflected from optical tape 1 is separated in beam splitter 73 and the reflected light beam is provided to a beam dump 78, so as to prevent the reflected high power laser light beam radiated during recording from falling incident upon laser diode 71. This construction also serves to absorb the heat of the light beam.

Figure 5:
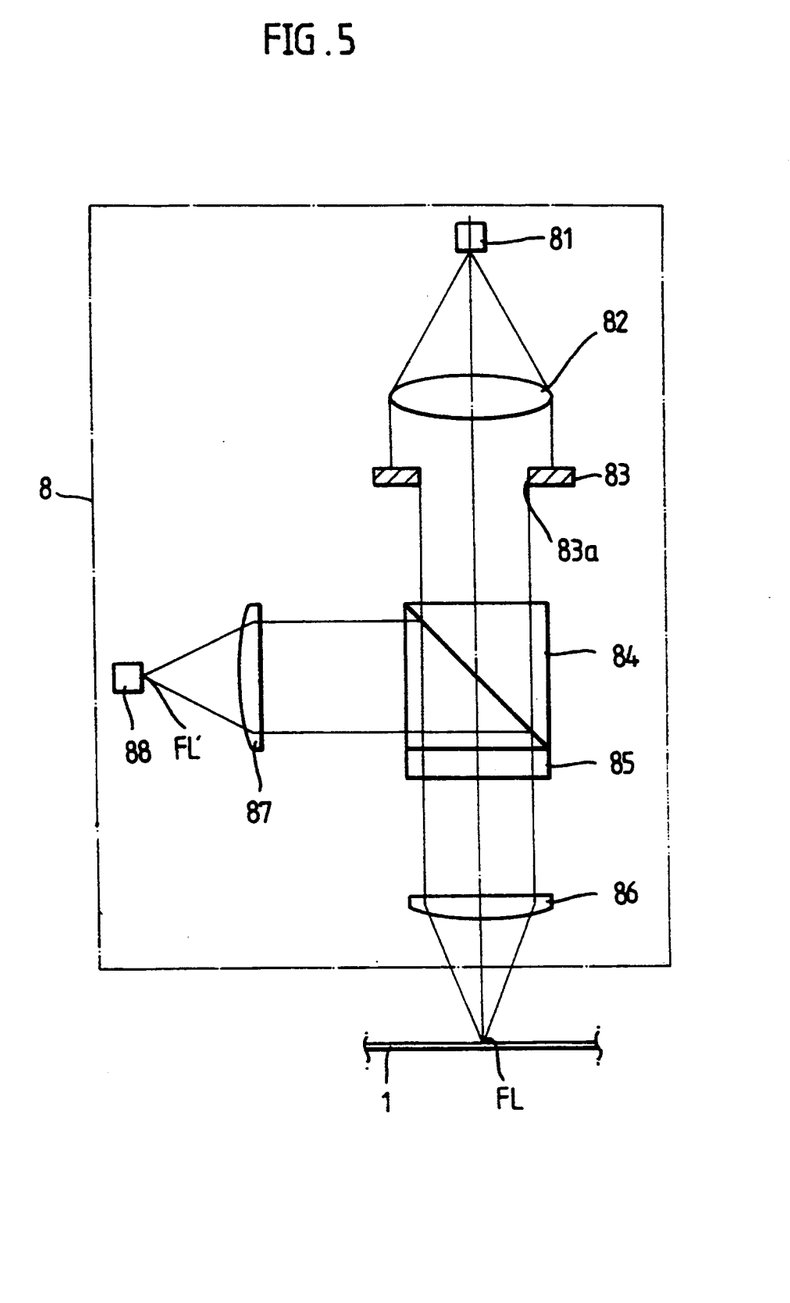
FIG. 5 is a schematic representation of the optical construction of an optical pickup for reproducing in the first preferred embodiment of the present invention.

The reproducing optical pickup 8 is shown in FIG. 5, and has a laser diode 81 emitting light, a collimating lens 82 for collimating the light emitted from laser diode 81, a square aperture 83, a beam splitter 84 for separating the incident light beam and the reflected light beam, a quarter phase plate 85 for changing a linearly polarized wave to a circularly polarized wave and a circularly polarized wave to a linearly polarized wave having a different plane of polarization, a cylindrical objective lens 86 for permeating the light beam passed through quarter phase plate 85 in the width direction of optical tape 1 and focussing the light beam in the length direction of optical tape 1 to form focal line FL on optical tape 1, a cylindrical detecting lens 87 for focussing the light beam reflected from beam splitter 84 on focal line FL', and a photodiode array 88 placed near the focal line of cylindrical detecting lens 87 for detecting the reflected light beam.

Figure 6:
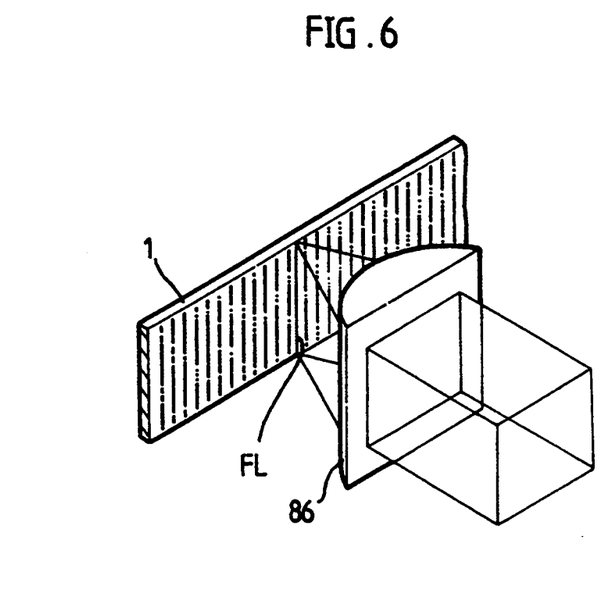
FIG. 6 is a perspective view illustrating the shape of the optical beam incident to the optical tape shown in FIG. 5.

In reproducing optical pickup 8, the laser light beam emitted from laser diode 81 is a linearly polarized wave. The light beam which is divergent is collimated by collimating lens 82. Aperture 83 has a square hole 83a whose center is set on the axis of the collimated light beam. Accordingly, the cross section of the parallel light beam passing through aperture 83 will be square. The parallel light beam having a square cross section enters beam splitter 84, and the linearly polarized wave passing therethrough is changed to a circularly polarized wave by quarter phase plate 85. That is, the light beam incident toward optical tape 1 is a parallel light beam having a square cross section, and a circularly polarized wave. The incident light beam, as shown in FIG. 6, is permeated in the width direction of the optical tape, while being focussed in its length direction by cylindrical objective lens 86, thereby forming focal line FL on optical tape 1. Then, the incident light beam focused on focal line FL is reflected from its optical tape 1 back through objective lens 86 so as to become a parallel beam. The reflected light beam is also a circularly polarized wave wherein the plane of the polarized wave rotates. Therefore, the reflected light beam passes back through the quarter phase plate to become a linearly polarized wave, which is reflected by beam splitter 84 and diverted to fall incident upon photodiode array 88 via cylindrical detecting lens 87.

Figure 7:
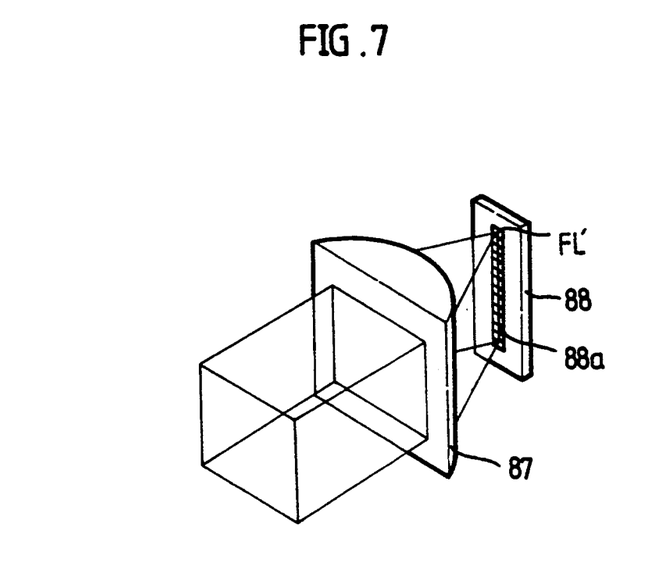
FIG. 7 is a perspective view illustrating the shape of the reflected light beam detected in the photodiode array shown in FIG. 5.

In cylindrical detecting lens 87 as shown in FIG. 7, the incident light beam is permeated in the width direction of optical tape 1, while being focussed in its length direction, thereby forming another focal line FL' on photodiode array 88. Photodiode array 88 consists of a plurality of photodiode elements 88a concentrated along focal line FL'. Accordingly, a playback signal group corresponding to the information group on focal line FL focussed on optical tape 1, is generated from photodiode array 88 based upon the detection state of each photodiode element 88a. The information can thus be reproduced by employing an ordinary logic circuit which arranges the information in the playback signal in a serial manner.

Figure 8:
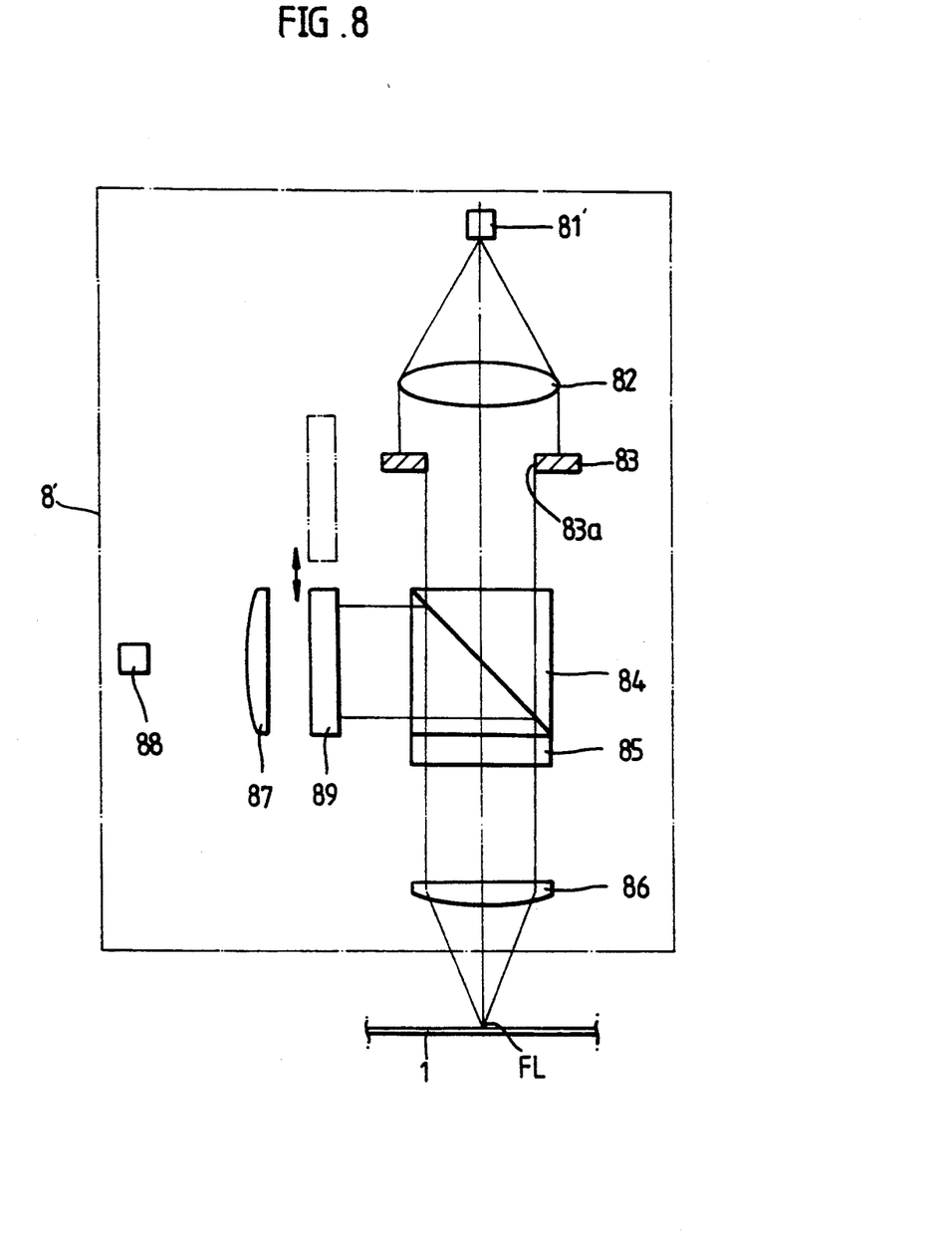
FIG. 8 is a schematic representation of an optical construction of the optical pickup for reproducing according to the second embodiment, which includes an erasing device.

FIG. 8 shows the optical structure of reproducing optical pickup 8' having an erasing unit according to the second embodiment of the present invention. The erasing unit has a beam shutter 89 which is movable so as to selectively block the reflected light beam between beam splitter 84 and cylindrical detecting lens 87 of the reproducing optical pickup. Laser diode 81', utilized in place of the laser diode 81, emits laser light beams having different energy levels when reproducing and erasing, respectively. That is, laser diode 81' emits a laser light beam having a high power for erasing during recording, while emitting a laser light beam having a low power during reproducing. A focal line FL is caused to fall incident on optical tape 1 during erasing and during reproducing, so that all the recorded information in a track of the tape 1 lying along the focal line is erased at the same time. However, during erasing, beam shutter 89 is moved between beam splitter 84 and photodiode array 88 so as to stop the reflected light beam, having a high power, from being diverted to photodiode array 88 thus preventing damage to photodiode array 88 or accidental data reproduction. Also, beam shutter 89 can absorb or radiate the heat of a high power laser light beam. Reproducing optical pickup 8' having such an erasing unit should be placed in front of recording optical pickup 7 (FIG. 3).

In the present invention, since an optical pickup unit for recording/reproducing is separated into a recording optical pickup and a reproducing optical pickup, the particular requirements of each pickup need not considered together, so that the design is easy. Furthermore, it is possible to simplify the optical structure. That is, for example, since a focal line can be radiated for detecting the entire information group in one track at the same time without scanning a beam spot as is the case during recording, the structure of the optical system is simple, and the galvanometer mirror is not driven during reproduction, as is the case during recording, so that power consumption is reduced during reproducing. Namely, the present invention contributes to cost reduction and is effective for reducing excessive power consumption and mechanical noise generation during reproducing.

An erasing unit using the heat energy of the light beam can be added to the reproducing optical pickup which is separated from the recording optical pickup, so that, by optically erasing the information, the overall structure of the apparatus becomes simple. For example, a separate cooling apparatus is not necessary as in the conventional method of erasing by a heating head. Particularly, the information is recorded promptly without delay during recording.

Therefore, the present invention provides a recording/reproducing apparatus which can optically record, reproduce and erase the information on an optical tape having a heat converting layer. Furthermore, the apparatus can be constructed at a low cost and exhibits less power consumption, and is particularly well-suited as a peripheral device of computers because it is capable of processing the information quickly.

Having described preferred embodiments of the present invention, it will be clear to those skilled in the art that modifications and alternatives to the disclosed apparatus exist within the scope and spirit of the present invention as defined by the following claims.

What is claimed is:

1. A recording and reproducing apparatus for an optical tape comprising:
    first optical pickup means for causing a light beam to scan an optical tape having a thermal converting layer, said light beam having a first predetermined amount of heat energy and being modulated in accordance with information to be recorded so as to optically record the information onto the optical tape;
    second optical pickup means for radiating a light having a second predetermined amount of heat energy onto the optical tape and detecting and reproducing the light reflected therefrom to read said information;
    said first and second optical pickup means each defining an exclusive optical path therein and being selectively operable based upon which one of recording and reproducing is required.

2. A recording and reproducing apparatus for an optical tape as claimed in claim 1, wherein said second optical pickup means comprises:
    a laser diode emitting a divergent light beam;
    a collimating lens disposed in the path of said divergent light beam so as to change the divergent light beam into a parallel light beam;
    a cylindrical objective lens disposed behind said collimating lens so as to focus the parallel light beam into a focal line corresponding to a track of an optical tape; and
    a photodiode array positioned proximate said optical tape so as to detect light reflected from said optical tape and generate a reproducing signal representing the information recorded on the track in the width direction of said optical tape.

3. A recording/reproducing apparatus for an optical tape as claimed in claim 2, further comprising:
    a square aperture disposed in the path of said parallel light beam for making the cross section of the parallel light beam square.

4. A recording/reproducing apparatus for an optical tape as claimed in claim 2, said second optical pickup means comprising:
    a laser diode respectively emitting light beams having first and second energy levels during reproducing and erasing, and
    a beam shutter which is movable into and out of a light path between said tape and said photodiode array so as to selectively shut out the light reflected from said optical tape.

5. A recording and reproducing apparatus for an optical tape comprising:
    first optical pickup means for causing a light beam to scan an optical tape having a thermal converting layer, said light beam having a first predetermined amount of heat energy and being modulated in accordance with information to be recorded so as to optically record the information onto the optical tape;
    second optical pickup means for radiating a light having a second predetermined amount of heat energy onto the optical tape and detecting and reproducing the light reflected therefrom to read said information, said second optical pickup means comprising;
        a laser diode respectively emitting light beams having first and second energy levels during reproduction and erasing;
        a collimating lens disposed in the path of said light beams to render the light beams parallel;
        a cylindrical objective lens disposed behind said collimating lens to focus the light beams into a focal line which corresponds to a track of an optical tape;
        a photodiode array positioned proximate said optical tape to detect light reflected from said optical tape and generate a reproducing signal representing the information recorded on the track in the width direction of the optical tape; and
        a beam shutter which is moveable into and out of a light path between said optical tape and said photodiode array to selectively shut out the light reflected from the optical tape;
    said first and second optical pickup means each defining an exclusive optical path therein and being selectively operable based upon which one of recording and reproducing is required.

6. A recording and reproducing apparatus for an optical tape comprising:
    first optical pickup means for causing a light beam to scan an optical tape having a thermal converting layer, said light beam having a first predetermined amount of heat energy and being modulated in accordance with information to be recorded so as to optically record the information onto the optical tape; and second optical pickup means for selectively radiating a reproducing light beam or a erasing light beam onto the optical tape depending upon which one of reproducing and erasing is required, said second optical pickup means being placed upstream of said first optical pickup means with respect to travel of said optical tape, wherein said first and second optical pickup means are activated during a recording operation, and only said second optical pickup means is activated during a reproducing operation.

7. A recording and reproducing apparatus for an optical tape as claimed in claim 6, wherein said second optical pickup means comprises:

a laser diode selectively emitting a divergent light beam having first and second energy levels during reproducing and erasing;

a collimating lens disposed in the path of said divergent light beam so as to change the divergent light beam into a parallel light beam;

a cylindrical objective lens disposed behind said collimating lens so as to focus the parallel light beam onto a focal line corresponding to a track of said optical tape; and a photodiode array positioned proximate said optical tape so as to detect light reflected from said optical tape and generate a reproducing signal representing the information recorded on the track in the width direction of said optical tape.

8. A recording and reproducing apparatus for an optical tape as claimed in claim 7, further comprising:

a square aperture disposed in the path of said parallel light beam for shaping the cross section of the parallel light beam into a square.

9. A recording and reproducing apparatus for an optical tape as claimed in claim 7, further comprising:

a beam shutter which can be moved into and out of an optical path between said tape and said photodiode array so as to selectively shut out the light reflected from said optical tape.

* * * * *